Sept. 12, 1967  JAMES E. WEBB  3,341,169
ADMINISTRATOR OF THE NATIONAL AERONAUTICS
AND SPACE ADMINISTRATION
FILLER VALVE
Filed Nov. 24, 1964  2 Sheets-Sheet 1
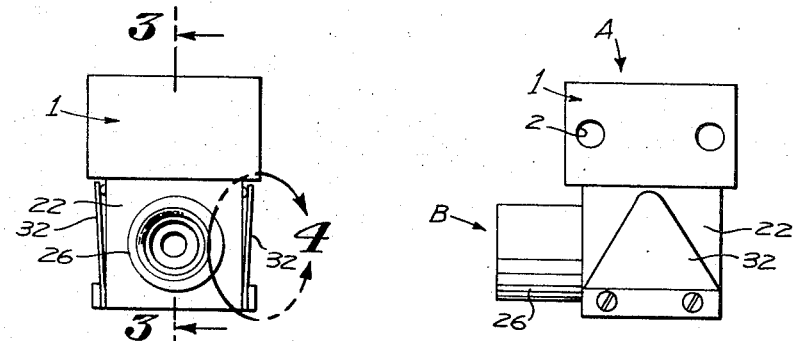
FIG. 1
FIG. 2
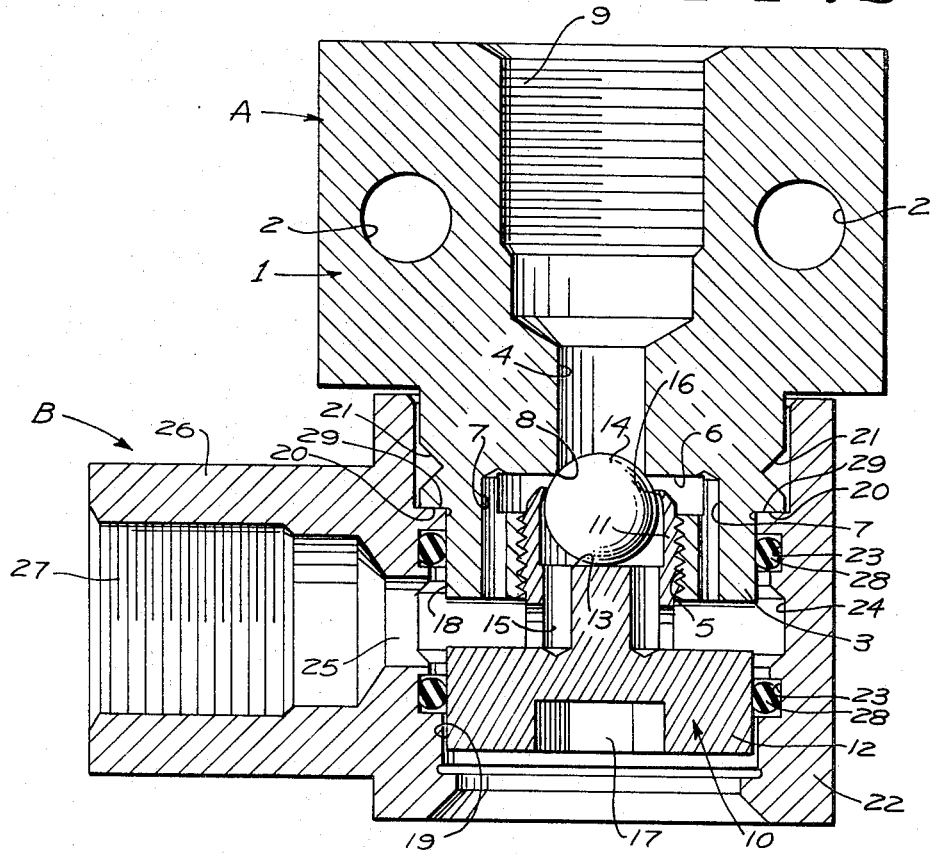
FIG. 3
INVENTOR.
WILLIAM F. MACGLASHAN, JR.
BY
9 Hm McCoy
ATTORNEY Sept. 12, 1967  
JAMES E. WEBB  
ADMINISTRATOR OF THE NATIONAL AERONAUTICS  
AND SPACE ADMINISTRATION  
FILLER VALVE  
3,341,169

Filed Nov. 24, 1964  
2 Sheets-Sheet 2

INVENTOR.  
WILLIAM F. MAC GLASHAN, JR.  
BY  
*[signature]*  
ATTORNEY

3,341,169
FILLER VALVE

James E. Webb, Administrator of the National Aeronautics and Space Administration with respect to an invention of William F. MacGlashan, Jr., Pasadena, Calif.

Filed Nov. 24, 1964, Ser. No. 413,661
7 Claims. (Cl. 251—148)

ABSTRACT OF THE DISCLOSURE

A filler valve consisting of a vehicle component, which is permanently attached to a vehicle. This component defines a flow passage through which fuel or the like is supplied to the vehicle. A valve carrier threadably coupled to the vehicle component is used to close or open the flow passage for communication with a supply passage, defined in a supply line component. The latter component is selectively coupled to the vehicle component. After being temporarily secured in place, the valve carrier is operated through the supply line component to open the flow passage for fuel supply. The supply is terminated by closing the flow passage with the valve carrier and disengaging the supply line component from the vehicle component.

---

The invention described herein was made in the performance of work under a NASA contract and is subject to the provisions of Section 305 of the National Aeronautics and Space Act of 1958, Public Law 85–568 (72 Stat. 435; 42 U.S.C. 4257).

This invention relates to filler valves, and included in the objects of this invention are:

First, to provide a filler valve which is particularly adapted for the purpose of supplying liquid propellant at high pressure to space vehicles and comprises a first component attached permanently to the vehicle and a second component forming the terminal end of a propellant supply line.

Second, to provide a filler valve wherein the vehicle component includes a valve element which may be manipulated between an open and a closed position while the supply line component is mounted thereon, so that the components may be connected while the valve element is closed, whereupon the valve element may be opened for a filling operator, then closed, without removal of the supply line component.

Third, to provide a filler valve of this type wherein the supply line component is subject, internally to opposed and balanced forces so that, irrespective of the pressures involved, the supply line component is free of any force tending to separate it from the vehicle component.

With the above and other objects in view, as may appear hereinafter, reference is directed to the accompanying drawings in which:

FIGURE 1 is a side view of the filler valve.

FIGURE 2 is another side view thereof at right angles to FIGURE 1.

FIGURE 3 is an enlarged sectional view taken through 3—3 of FIGURE 1.

Figure 4:
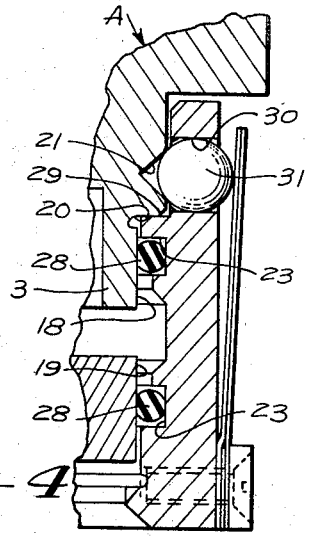
FIGURE 4 is an enlarged fragmentary sectional view taken in circle 4 of FIGURE 1.

FIGURES 5, 6, 7, and 8 are fragmentary sectional views of the view showing various modifications of the valve element and adjacent portions of the valve.

The filler valve comprises a vehicle component A which is intended for permanent attachment to a special vehicle and a supply component B which is secured to a supply line. The two components are adapted to be readily connected or disconnected.

The vehicle component A includes a valve block 1 having suitable mounting holes 2 for attachment to the space vehicle. The valve block is provided with a boss 3 at one end which is circular in cross section. A bore or flow passage 4 extends through the valve block 1 and its boss 3. The extended end of the boss is provided with a screw threaded socket 5 which intersects a valve chamber 6 of greater diameter than the socket. Surrounding the socket is a ring of axially extending bores 7 which intersect the valve chamber. At the junction between the valve chamber and the bore 4 there is formed a valve seat 8. The end of the valve bore or flow passage 4 opposite from the boss 3 is internally screw threaded as indicated by 9 or otherwise provided with means for attachment to a flow line not shown within the space vehicle.

A screw cap or valve carrier 10 is provided which includes a screw threaded stem 11 adapted to fit the socket 5 and a head 12 equal in diameter to the boss 3. The stem 11 is provided with a socket 13 which receives a valve ball 14 adapted to engage the valve seat 8. The stem 11 is provided with one or more small passages 15 which communicate between the socket 13 and the base of the stem to facilitate flushing the socket 13. The valve ball is retained in place by an annular inturned rib 16 formed at the extended end of the stem 11. The outer end of the head 12 is provided with a wrench socket 17 or other means for engagement by a turning tool.

The extended portion of the boss 3 forms a sealing ring engaging surface 18 and the periphery of the head 12 also forms a sealing ring engaging surface 19 which as indicated previously is of equal diameter. Inwardly from the sealing ring engaging surface 18 the boss 3 is provided with a stop shoulder 20 and inwardly from the stop shoulder 20 the boss is provided with an annular retainer groove 21 preferably of V-shaped cross section. The sealing ring engaging surfaces 18 and 19 are spaced so that fluid may enter the axial portions 7.

The supply line component A includes a sleeve 22 having a circular bore but is preferably square externally. Internally the sleeve 22 is provided with a pair of O-ring grooves 23 separated by a channel 24. Extending radially outwardly from the channel 24 is an inlet port 25 contained within a radial boss 26. The extremity of the inlet port is internally screw threaded as indicated by 27 for attachment to a supply line not shown. The grooves 23 receive O-rings 28 for sealing engagement with the surfaces 18 and 19.

Beyond the inner O-ring groove 23, the sleeve is enlarged internally to form a shoulder 29 which encases the shoulder 20. The sleeve is provided with one or more side openings 30 which align with the groove 21 when the shoulders 20 and 29 are in engagement as shown in FIGURE 4. These openings receive retainer balls 31. Each retainer ball is backed by a spring 32 secured to an external surface of the sleeve.

Operation of the filler valve is as follows:

The valve ball 14 is normally in its closed position shown in FIGURE 3. When it is desired to supply fluid such as liquid propellant, the sleeve 22 of the component B is fitted over the boss 3 and latched thereto by the retainer balls 31 as shown in FIGURES 3 and 4. The valve carrier 10, which it will be noted, is exposed at the end of the sleeve 22, is then engaged by a suitable tool so as to open valve for flow of fluid through the bore or passage 4. When the filling operation or, in some cases a draining operation, has been completed, the valve ball is reseated and the supply line component B may then be readily removed.

It will be observed that by reason of the fact that the sealing surfaces 18 and 19 are of equal diameter the pressure of the fluid has no effect on the connection between the two valve components.

Figure 5:
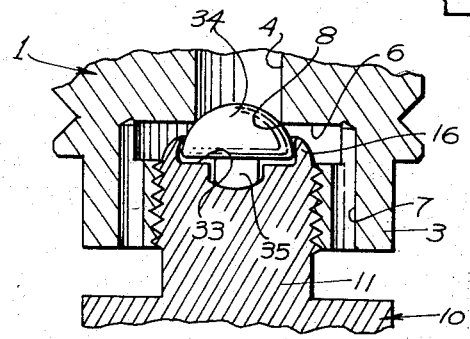

Reference is now directed to FIGURE 5. In the construction here illustrated, the upper end of the stem 11 is provided with a modified socket 33 which loosely receives a hemispherical seal button 34 having a short stem 35. The seal button is loosely retained by the annular lip 16.

Figure 6:
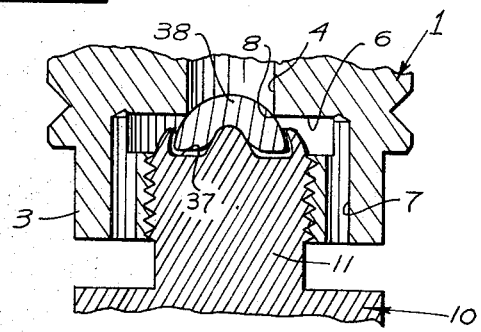

Reference is now directed to FIGURE 6. In the construction here illustrtaed, a modified socket 37 is provided with a central fulcrum boss which pivotally supports a hemispherical seal button 38 having a central recess. Again, the lip 16 loosely retains the seal button.

Figure 7:
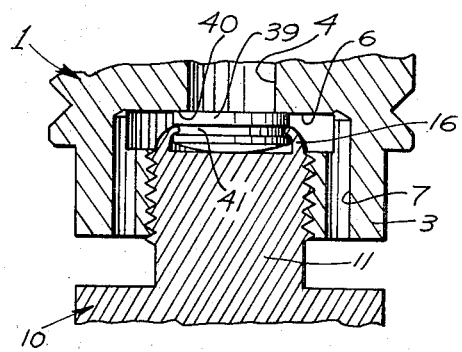

Reference is now directed to FIGURE 7. In this case a seal disk 39 is employed. The seal disk has a flat seat engaging surface 40, and an annular groove 41 in which the lip 16 is forced to loosely retain the disk 39. The underside of the disk is convex to permit adjustment of the disk to its seat and to prevent rotation of the disk on the seat when the valve carrier 10 is turned.

Figure 8:
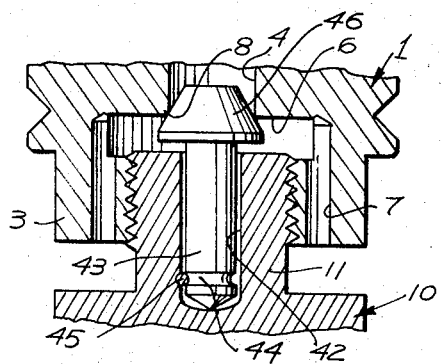

Reference is now directed to FIGURE 8. In this construction the seal lip 16 is omitted and the stem 11 is provided with a deep socket 42 of small diameter which receives a stem 43 having a groove 44 near its inner end to receive a transverse retainer pin 45. In this case, the stem 43 is provided with a conical sealing head 46. The extremity of the stem is conical to provide a point contact so that the head 46 does not rotate when the valve carrier 10 is turned.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A filler valve, comprising:
   (a) a valve body having a screw threaded socket at one end defining a valve chamber, a valve seat at the inner end of said socket, a bore continuing from said valve seat forming an outlet at the opposite end of said valve body, and a flow passage from said valve chamber to said one end of said valve body;
   (b) a valve carrier having a stem screw threaded in said socket and a head confronting said one end and spaced therefrom;
   (c) a valve element carried by said stem for engaging said valve seat;
   (d) said valve body and said valve carrier head having coaxial external cylindrical seal ring surfaces of equal diameter;
   (e) a removable open ended sleeve having a pair of seal rings engaging said surfaces and means defining an inlet passageway between said seal rings and communicating with the space between said one end and said head;
   (f) and means for operation of said valve carrier.

2. The filler valve as recited in claim 1 wherein said sleeve further defines an opening, through which said means for operation is exposed when said sleeve is selectively engaged with said valve body and said valve carrier head, whereby said means for operation is operable through said opening.

3. The filler valve as recited in claim 2 wherein said valve body defines at least one external annular groove, extending about the periphery thereof, and said filler valve further includes biased means coupled to said sleeve for engaging said groove, to selectively couple said sleeve to said valve body.

4. The filler valve as recited in claim 2 wherein said means for operation is rotatable about a longitudinal axis of said stem, for rotating said stem in said socket to control the engagement of said valve element with said valve seat.

5. A filler valve comprising:
   a valve body having an engaging member at one end, said body defining an internal valve chamber of a first radial diameter and an outlet passage of a second, smaller diameter, extending from said chamber to an outlet at the opposite end of said valve body, said chamber and outlet passage defining a valve seat, said valve body further defining a flow passage from said valve chamber to said one end thereof;
   valve control means including a member controllably engageable to the engaging member of said valve body to control the communication between said valve chamber and said outlet passage, said control means including a head confronting said one end and spaced therefrom, and adjusting means for controlling the engagement of said control means with said valve body, said valve body and said valve control means having coaxial external cylindrical seal ring surfaces of equal diameter;
   an open ended sleeve having a pair of seal rings and defining an inlet passageway between said seal rings; and
   means for selectively coupling said sleeve to said valve body and the head of said valve control means, whereby said seal rings of said sleeve engage said surfaces and said inlet passageway is in communication with the space between said one end and said head, said sleeve defining a control aperture through which said adjusting means is exposed.

6. The filler valve as recited in claim 5 wherein the engaging member of said valve body is a screw-threaded socket and said member of said valve control means is a screw-threaded stem, threadably engaging said socket.

7. The filler valve as recited in claim 6 wherein said valve control means further includes a valve element carried by said stem, said element being controllably positioned within said chamber with respect to said valve seat to control the communication between said valve chamber and said outlet passage.

References Cited

UNITED STATES PATENTS

| | | | |
|---|---|---|---|
| 1,773,110 | 8/1930 | Meyers | 251—152 |
| 2,452,430 | 10/1948 | Clark | 285—304 |
| 2,771,308 | 11/1956 | Vitcha | 285—304 |
| 2,950,895 | 8/1960 | Anderson | 251—148 |
| 3,036,595 | 5/1962 | Rogers | 251—148 |

FOREIGN PATENTS 112,003  12/1917  Great Britain.

M. CARY NELSON, *Primary Examiner.*

W. CLINE, *Assistant Examiner.*